US012125156B2

(12) United States Patent
Palanichamy et al.

(10) Patent No.: US 12,125,156 B2
(45) Date of Patent: Oct. 22, 2024

(54) METHOD AND SYSTEM FOR EVALUATING LUMINANCE IN AUGMENTED REALITY (AR) APPLICATIONS

(71) Applicant: HCL Technologies Limited, New Delhi (IN)

(72) Inventors: Banumathi Palanichamy, Chennai (IN); Selvaraj Thangaraj, Chennai (IN); Reshna Rajasekharan, Chennai (IN); Siva Sakthivel S, Chennai (IN)

(73) Assignee: HCL Technologies Limited, New Delhi (IN)

( * ) Notice: Subject to any disclaimer, the term of this patent is extended or adjusted under 35 U.S.C. 154(b) by 203 days.

(21) Appl. No.: 17/970,599

(22) Filed: Oct. 21, 2022

(65) Prior Publication Data

US 2023/0196687 A1    Jun. 22, 2023

(51) Int. Cl.
*G06T 19/00*    (2011.01)
*G06T 7/11*    (2017.01)
(Continued)

(52) U.S. Cl.
CPC .............. *G06T 19/006* (2013.01); *G06T 7/11* (2017.01); *G06T 7/70* (2017.01); *G06T 19/20* (2013.01);
(Continued)

(58) Field of Classification Search
CPC . G06T 19/006; G06T 7/11; G06T 7/70; G06T 19/20; G06T 2219/2004
(Continued)

(56) References Cited

U.S. PATENT DOCUMENTS 7,050,078 B2    5/2006    Dempski
8,035,612 B2    10/2011   Bell et al.
(Continued)

FOREIGN PATENT DOCUMENTS

CA    2849902 C    2/2019
JP    6062547 B2   1/2017
(Continued)

OTHER PUBLICATIONS

Michael J. Murdoch, Brightness matching in optical see-through augmented reality, Journal of the Optical Society of America A, vol. 37, Issue 12, pp. 1927-1936 (2020) •https://doi.org/10.1364/JOSAA. 398931, Published: Nov. 18, 2020.

*Primary Examiner* — Thomas J Lett
(74) *Attorney, Agent, or Firm* — Kendal M. Sheets (57) ABSTRACT

The disclosure relates to method and system for evaluating luminance in Augmented Reality (AR) applications. The method includes receiving a plurality of video frames corresponding to an AR object in a real-world environment at a current camera angle; for each of the plurality of video frames, subtracting the set of AR object pixels from the set of environment pixels in a frame; calculating mean luminance value corresponding to the set of AR object pixels in each of the at least one of the plurality of blocks in the frame and corresponding to each of the plurality of blocks of the grid in the real-world environment through a light sensor; comparing mean luminance value for each of the plurality of blocks of the grid with mean luminance value corresponding to the set of AR object pixels; and evaluating luminance of AR object at the current location in the AR application.

20 Claims, 9 Drawing Sheets

(51) Int. Cl.
  *G06T 7/70*      (2017.01)
  *G06T 19/20*     (2011.01)
  *G06V 10/60*     (2022.01)
  *G06V 10/74*     (2022.01)

(52) U.S. Cl.
  CPC ............ *G06V 10/60* (2022.01); *G06V 10/761* (2022.01); *G06T 2219/2004* (2013.01)

(58) Field of Classification Search
  USPC ........................................................ 345/419
  See application file for complete search history.

(56)            References Cited

U.S. PATENT DOCUMENTS

| | | |
|---|---|---|
| 9,622,326 B1 | 4/2017 | Devyver et al. |
| 9,727,132 B2 | 8/2017 | Liu et al. |
| 10,101,586 B2 | 10/2018 | Fujimaki et al. |
| 2018/0286030 A1* | 10/2018 | Sadasivam ............. G06T 7/001 |
| 2019/0361797 A1 | 11/2019 | Yerli |
| 2020/0035031 A1 | 1/2020 | Konings et al. |
| 2020/0035032 A1* | 1/2020 | Klein ..................... G06T 19/20 |
| 2022/0398986 A1* | 12/2022 | DeWall ................... G06F 3/147 |
| 2023/0122623 A1* | 4/2023 | Zhang ..................... G06T 11/00 |
| | | 382/100 |

FOREIGN PATENT DOCUMENTS

| | | |
|---|---|---|
| KR | 102153599 B1 | 9/2020 |
| WO | 2019046334 A1 | 3/2019 |

* cited by examiner

METHOD AND SYSTEM FOR EVALUATING LUMINANCE IN AUGMENTED REALITY (AR) APPLICATIONS

TECHNICAL FIELD

This disclosure relates generally to application testing, and more particularly to method and system for evaluating luminance in Augmented Reality (AR) applications.

BACKGROUND

Augment Reality (AR) is the one of the emerging technologies in the global technological landscape. Many applications are readily available in the market for real-time implementation in various domains such as, medical, aerospace, automobiles, and the like. Therefore, an AR application and objects in the AR application must be validated and tested thoroughly before the application is released.

Currently, various testing devices have been introduced which may provide testing of AR objects in a real-world environment. However, the existing testing techniques fail to accurately match the AR objects with the surrounding light of real-world environment and such techniques include very complex and time-consuming processes. Therefore, there is a need in the art for improved methods and systems for evaluating luminance in AR applications that may provide automated testing for AR applications and quality of display of the AR objects. Moreover, there is a need in the present state of art for techniques which are easy to use and may have a higher adoption.

SUMMARY

In an embodiment, a method for evaluating luminance in Augmented Reality (AR) applications is disclosed. In one example, the method may include receiving a plurality of video frames corresponding to an AR object in a real-world environment in real-time from an AR application at a current camera angle. Each of the plurality of video frames may include a grid. The grid may further include a plurality of blocks. The AR object in each of the plurality of video frames may include a set of AR object pixels and the real-world environment in each of the plurality of video frames may include a set of environment pixels. The method may further include for each of the plurality of video frames, subtracting the set of AR object pixels from the set of environment pixels in a frame to identify a current location of the AR object in the frame. The current location of the AR object corresponds to at least one of the plurality of blocks in the frame. For each of the plurality of video frames, the method may further include calculating a mean luminance value corresponding to the set of AR object pixels in each of the at least one of the plurality of blocks in the frame, calculating a mean luminance value corresponding to each of the plurality of blocks of the grid in the real-world environment through a light sensor, comparing the mean luminance value for each of the plurality of blocks of the grid with the mean luminance value corresponding to the set of AR object pixels in each of the at least one of the plurality of blocks in the frame, and evaluating luminance of the AR object at the current location in the AR application based on the comparing.

In another embodiment, a system for evaluating luminance in AR applications is disclosed. In one example, the system may include an AR device comprising a processor and a memory communicatively coupled to the processor, wherein the memory stores processor-executable instructions, which, on execution, may cause the processor to receive a plurality of video frames corresponding to an AR object in a real-world environment in real-time from an AR application at a current camera angle. Each of the plurality of video frames may include a grid. The grid may include a plurality of blocks. The AR object in each of the plurality of video frames may include a set of AR object pixels and the real-world environment in each of the plurality of video frames may include a set of environment pixels. For each of the plurality of video frames, the processor-executable instructions, on execution, may further cause the processor to subtract the set of AR object pixels from the set of environment pixels in a frame to identify a current location of the AR object in the frame. The current location of the AR object corresponds to at least one of the plurality of blocks in the frame. For each of the plurality of video frames, the processor-executable instructions, on execution, may further cause the processor to calculate a mean luminance value corresponding to the set of AR object pixels in each of the at least one of the plurality of blocks in the frame, calculate a mean luminance value corresponding to each of the plurality of blocks of the grid in the real-world environment through a light sensor, compare the mean luminance value for each of the plurality of blocks of the grid with the mean luminance value corresponding to the set of AR object pixels in each of the at least one of the plurality of blocks in the frame, and evaluate luminance of the AR object at the current location in the AR application based on the comparing.

In another embodiment, a computer program product for evaluating luminance in AR applications is disclosed. In one example, the computer program product is embodied in a non-transitory computer readable storage medium of an AR device and includes computer instructions for receiving a plurality of video frames corresponding to an AR object in a real-world environment in real-time from an AR application at a current camera angle. Each of the plurality of video frames may include a grid. The grid may further include a plurality of blocks. The AR object in each of the plurality of video frames may include a set of AR object pixels and the real-world environment in each of the plurality of video frames may include a set of environment pixels. The computer instructions may further include for each of the plurality of video frames, subtracting the set of AR object pixels from the set of environment pixels in a frame to identify a current location of the AR object in the frame. The current location of the AR object corresponds to at least one of the plurality of blocks in the frame. For each of the plurality of video frames, the computer instructions may further include calculating a mean luminance value corresponding to the set of AR object pixels in each of the at least one of the plurality of blocks in the frame, calculating a mean luminance value corresponding to each of the plurality of blocks of the grid in the real-world environment through a light sensor, comparing the mean luminance value for each of the plurality of blocks of the grid with the mean luminance value corresponding to the set of AR object pixels in each of the at least one of the plurality of blocks in the frame, and evaluating luminance of the AR object at the current location in the AR application based on the comparing.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
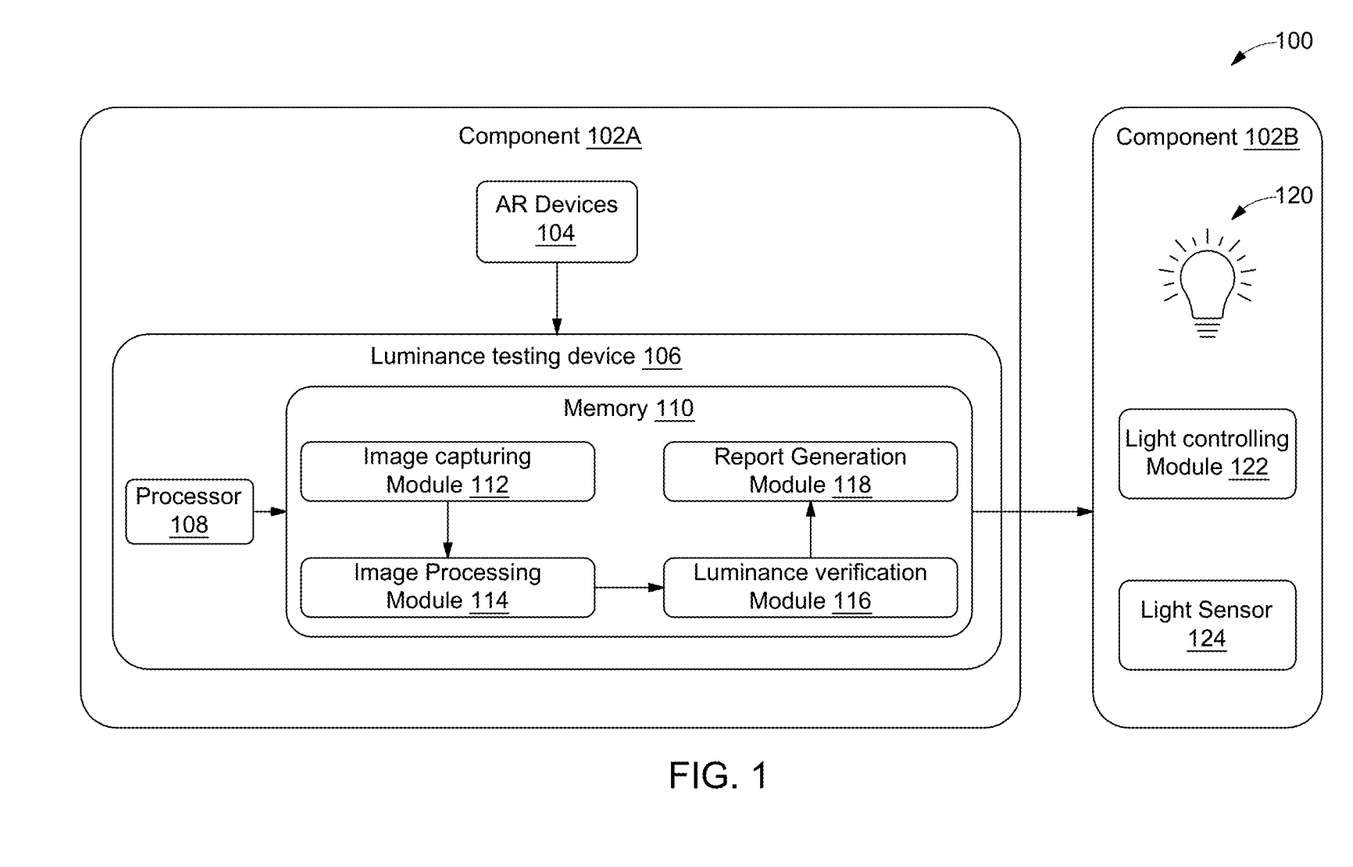
FIG. 1 is a block diagram of an exemplary system for evaluating luminance in Augmented Reality (AR) applications, in accordance with some embodiments.

Referring now to FIG. 1, an exemplary system 100 for evaluating luminance in Augmented Reality (AR) applications is illustrated, in accordance with some embodiments of the present disclosure. The system 100 may include a component 102A and a component 102B. The component 102A may include an AR device 104. The AR device 104 may further include a luminance testing device 106 and a processor 108. In some embodiment, the luminance testing device 106 may be connected to the AR device 104 through wired/wireless connection. The luminance testing device 106 may include a memory 110. The memory 110 may include a plurality of modules such as, an image capturing module 112, an image processing module 114, a luminance verification module 116, and a report generation module 118. The component 102B may include at least one light source 120, a light sensor 124 (for example, a lux sensor) and a light controlling module 122. These modules are explained in detail in conjunction with FIG. 2. Further, the memory 110 may store instructions that, when executed by the processor 108, cause the processor 108 to perform one or more operations, in accordance with aspects of the present disclosure.

The luminance testing device 106 may facilitate testing of an AR application in, but not limited to, lighting reflections, lighting direction replications, and validate whether the AR object is merged with real world lighting. It should be noted that, for testing an AR application, the application may be loaded in AR devices 104. By way of an example, the AR devices 104 may include server, desktop, laptop, notebook, netbook, iPod, tablet, smartphone, mobile phone, or any other computing device.

As will be described in greater detail in conjunction with FIGS. 2-8, the luminance testing device 106 may receive a plurality of video frames corresponding to an AR object in a real-world environment in real-time from an AR application at a current camera angle. Each of the plurality of video frames may include a grid. The grid may include a plurality of blocks. The AR object in each of the plurality of video frames may include a set of AR object pixels and the real-world environment in each of the plurality of video frames may include a set of environment pixels. For each of the plurality of video frames, the luminance testing device 106 may subtract the set of AR object pixels from the set of environment pixels in a frame to identify a current location of the AR object in the frame. The luminance testing device 106 may further calculate a mean luminance value corresponding to the set of AR object pixels in each of the at least one of the plurality of blocks in the frame, and further calculate a mean luminance value corresponding to each of the plurality of blocks of the grid in the real-world environment through a light sensor. The luminance testing device 106 may further compare the mean luminance value for each of the plurality of blocks of the grid with the mean luminance value corresponding to the set of AR object pixels in each of the at least one of the plurality of blocks in the frame and evaluate luminance of the AR object at the current location in the AR application based on the comparing.

Figure 2:
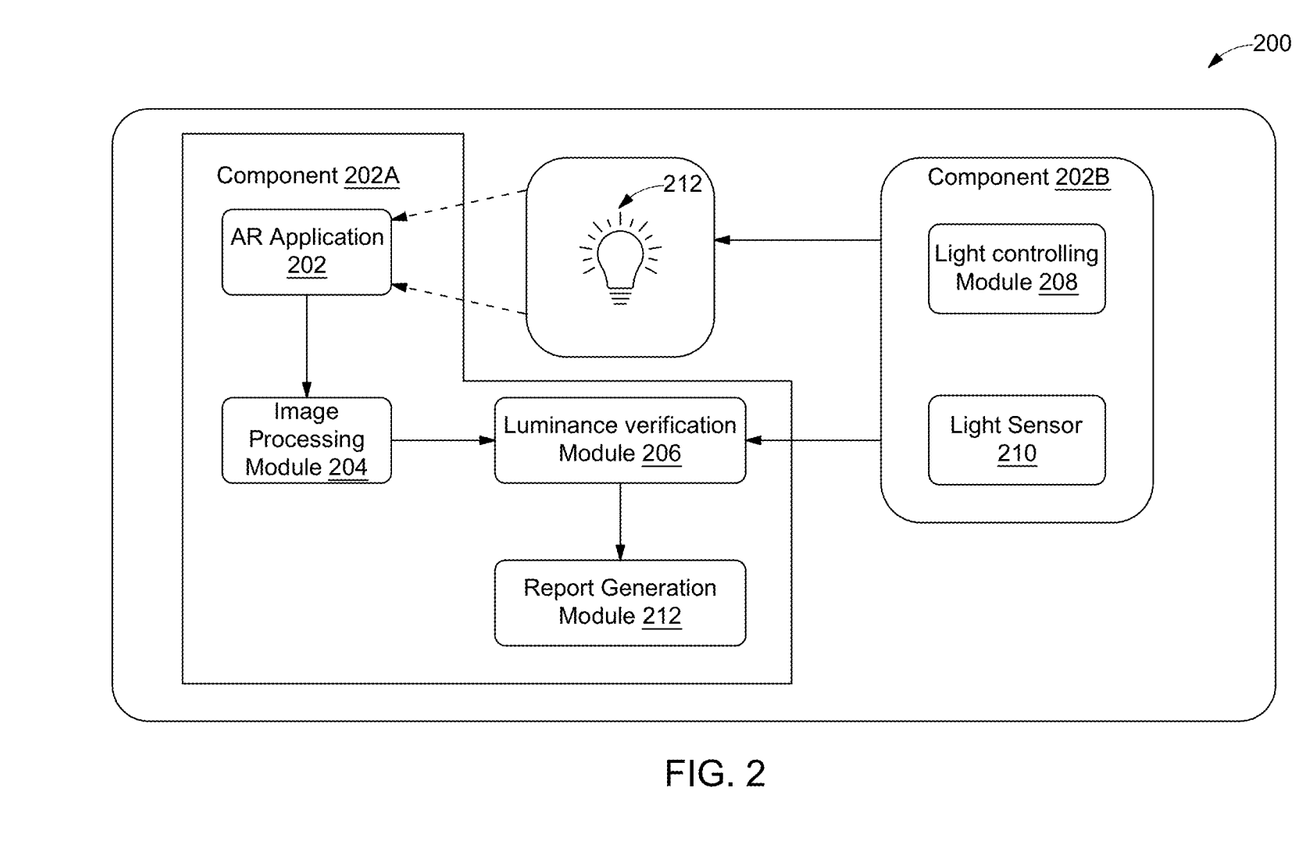
FIG. 2 is a functional block diagram illustrating various modules within a memory of a luminance testing device, in accordance with some embodiments.

Referring now to FIG. 2, a functional block diagram of a system 200 is illustrated, in accordance with some embodiments. The system 200 may include a component 202A and a component 202B. In an embodiment, the component 202A and the component 202B may be analogous to the component 102A and the component 102B of the system 100. The component 202A may include an AR application 202, an image processing module 204, a luminance verification module 206, and a report generation module 214. As mentioned above, once the AR application 202 is loaded in the AR device 104, the corresponding AR application 202, AR object and the entire application screen may be captured through the image capturing module 112. Further, the images (including an AR object) captured from the image capturing module 112 may be transmitted to the image processing module 204. The image processing module 204 may further processes such captured images for testing regarding luminance effect for the one or more testing scenarios with AR object using light sensor 210. For example, the image processing module 204 may identify whether the real-world lighting is proportionately reflected on the AR object. Further, the image processing module 204 may determine luminance density of the AR object and direction of the luminance from the real-world environment. Further, the image processing module 204 may compare percentage of real-world lighting with respect to the AR object lighting effect.

In one embodiment, for all the above test scenarios, the image processing module 204 may collects the luminance value with a corresponding luminance value and the locations of AR object. The AR object location may be identified through an image subtraction using real world image and AR object. Further, the collection of luminance value and corresponding coordinates may be separated into two arrays i.e., one for real world and another for AR object.

In one embodiment, the component 202B may include a light controlling module 208 (for example, a light brightness controller), a light sensor 210. The component 202B may be communicatively coupled with one or more light sources 212. It should be noted that all such aforementioned modules 208-212 may be analogous to the modules 120-122 and may be coupled with the luminance testing device 106. The luminance testing device 106 may regulate (increase or decrease) brightness levels of the one or more light sources 212 through the light controlling module 208. Once the lighting brightness is fixed, the light sensor 210 may measure the lighting effect value in the environment which is nearer to the AR application 202. In an embodiment, the luminance testing device 106 may regulate brightness levels and read light sensor values automatically with various environments by applying different light value through automation script. This may be done through the luminance testing device 106 and corresponding lighting values may be captured for validations and testing.

As mentioned earlier, the collection of luminance value and its corresponding pixel values may be stacked into structured array or in the dataset format. The luminance verification module 206 may further compare these luminance value with lighting effect and without lighting effect, whether the object is reflecting the same and verifying the luminance effect whether it is applied or not through light sensor data. In some embodiment, these values may be compared automatically by moving the AR object in various positions, moving the AR devices in various locations, providing different light effect values such as, dim light, bright light, night mode, sunshine mode, light filters, or the like. Based on these automations a test report may be generated by the report generation module 214. Further the generated report may be used to verify whether the AR object is reflected appropriately.

Further, aluminance density may be determined by comparing the luminance value with lighting effect passed based on whether the lighting effect is applied depends upon the light sensor value. Further, the structured array may be sort using luminance value. Based on the highest value arrangements, the high-density luminance locations as well as low density luminance locations in the AR object may be identified.

It should be noted that all such aforementioned modules 202-208 may be represented as a single module or a combination of different modules. Further, as will be appreciated by those skilled in the art, each of the modules 202-208 may reside, in whole or in parts, on one device or multiple devices in communication with each other. In some embodiments, each of the modules 202-208 may be implemented as dedicated hardware circuit comprising custom application-specific integrated circuit (ASIC) or gate arrays, off-the-shelf semiconductors such as logic chips, transistors, or other discrete components. Each of the modules 202-208 may also be implemented in a programmable hardware device such as a field programmable gate array (FPGA), programmable array logic, programmable logic device, and so forth. Alternatively, each of the modules 202-208 may be implemented in software for execution by various types of processors (e.g., processor 104). An identified module of executable code may, for instance, include one or more physical or logical blocks of computer instructions, which may, for instance, be organized as an object, procedure, function, or other construct. Nevertheless, the executables of an identified module or component need not be physically located together but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for evaluating luminance in AR applications. For example, the exemplary system 100 and the associated luminance testing device 106 may identify common requirements from applications by the processes discussed herein. In particular, as will be appreciated by those of ordinary skill in the art, control logic and/or automated routines for performing the techniques and steps described herein may be implemented by the system 100 and the associated luminance testing device 106 either by hardware, software, or combinations of hardware and software. For example, suitable code may be accessed and executed by the processor on the system 100 to perform some or all of the techniques described herein. Similarly, application specific integrated circuits (ASICs) configured to perform some, or all of the processes described herein may be included in the processor on the system 100.

Figure 3A:
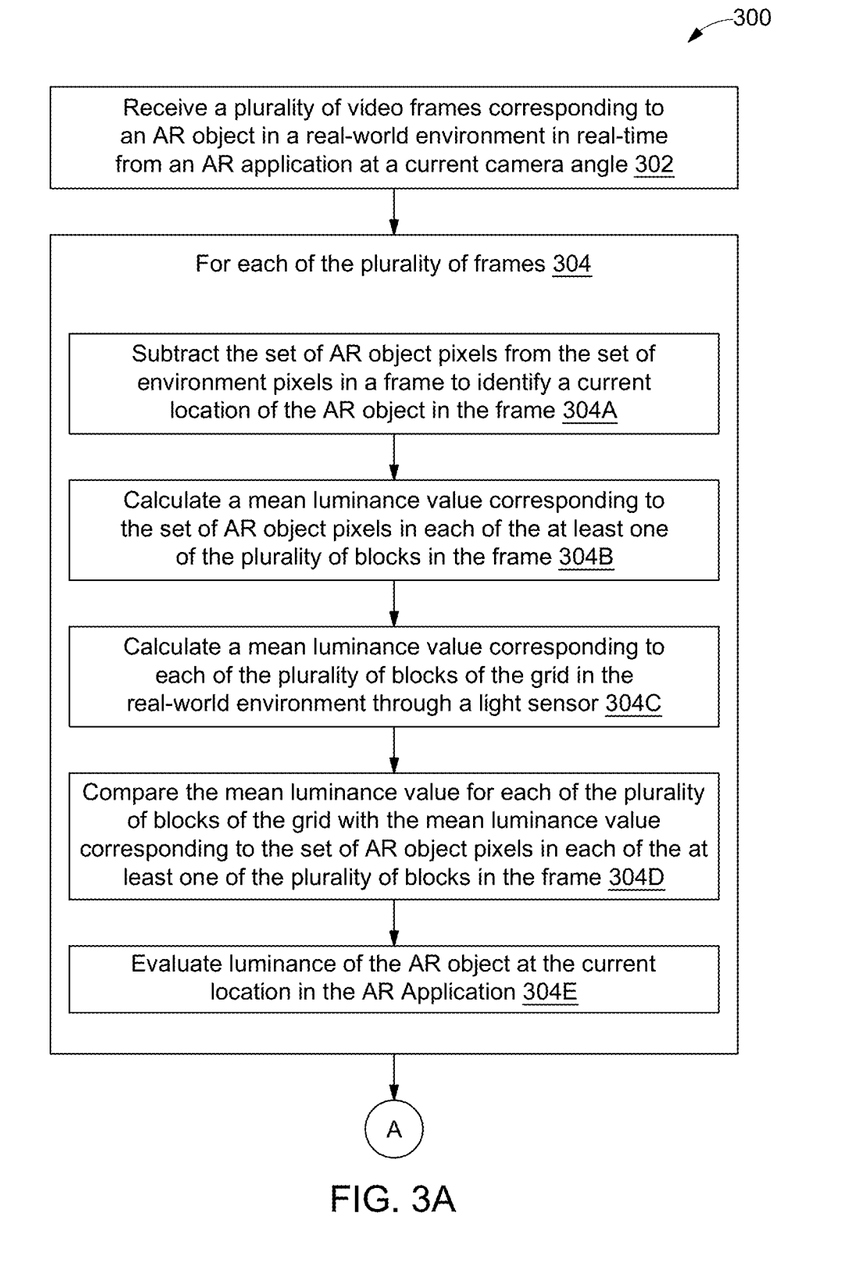
FIGS. 3A and 3B illustrate an exemplary process for evaluating luminance in AR applications, in accordance with some embodiments of the present disclosure.
Figure 3B:
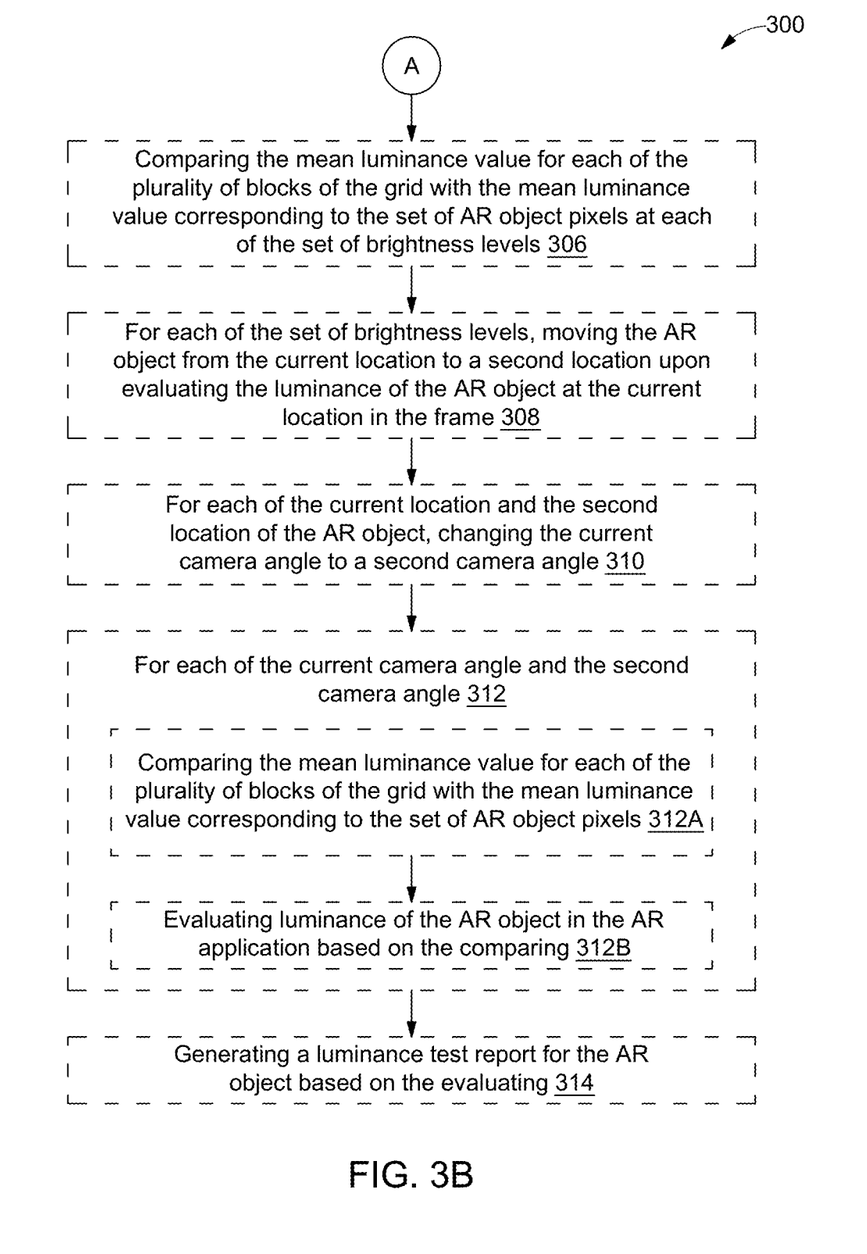

Referring now to FIGS. 3A and 3B, an exemplary process 300 for evaluating luminance in AR applications, in accordance with some embodiments. The process 300 may be implemented by the luminance testing device 106 of the system 100. The process 300 includes receiving a plurality of video frames corresponding to an AR object in a real-world environment in real-time from an AR application at a current camera angle, at step 302. It may be noted that each of the plurality of video frames may include a grid. The grid may further include a plurality of blocks. The AR object in each of the plurality of video frames may include a set of AR object pixels and the real-world environment in each of the plurality of video frames may include a set of environment pixels. In some embodiments, the real-world environment may include one or more light sources. Each of the one or more light sources may further include a set of brightness levels.

Further, for each of the plurality of video frames, the step 304 of the process 300 includes subtracting the set of AR object pixels from the set of environment pixels in a frame to identify a current location of the AR object in the frame, at step 304A. It may be noted that the current location of the AR object corresponds to at least one of the plurality of blocks in the frame. For example, the image processing module 204 may subtract the AR object from real world image (i.e., the frame) to identify a current location of the AR object.

Further, the step 304 of the process 300 includes calculating a mean luminance value corresponding to the set of AR object pixels in each of the at least one of the plurality of blocks in the frame, at step 304B. Further, the step 304 of the process 300 includes calculating a mean luminance value corresponding to each of the plurality of blocks of the grid in the real-world environment through a light sensor (for example, the light sensor 124), at step 304C. As an example, the image processing module 204 may divide the frame into a grid of about 8 blocks through various mid values of length and width of the frame. In an embodiment, each of the blocks of the grid may be of identical dimensions. Further, the image processing module 204 may receive luminance values corresponding to each of the plurality of pixels in the frame through the light sensor 210. The image processing module 204 may calculate the mean luminance value of the block in the grid using luminance values of each of the plurality of pixels in the block. Further, the image processing module 204 may calculate the mean luminance value corresponding to the set of AR object pixels in each of the at least one of the plurality of blocks in the frame that include the AR object.

Additionally, the image processing module 204 may determine a direction of luminance based on the mean luminance value corresponding to each of the plurality of blocks of the grid. This is further explained in detail in conjunction with FIG. 4. In an embodiment, the image processing module 204 may determine a density of luminance for each of the plurality of blocks of the grid based on the mean luminance value corresponding to each of the plurality of blocks of the grid. This is explained in detail in conjunction with FIG. 2, as mentioned above.

Further, the step 304 of the process 300 includes comparing the mean luminance value for each of the plurality of blocks of the grid with the mean luminance value corresponding to the set of AR object pixels in each of the at least one of the plurality of blocks in the frame, at step 304D. Further, the step 304 of the process 300 includes evaluating luminance of the AR object at the current location in the AR application based on the comparing, at step 304E. As an example, the luminance verification module 206 may compare the mean luminance value with and without lighting effect to verify whether the luminance values reflected by the AR object is equivalent or proportionate to the luminance values of the real-world environment.

Further, the process 300 includes comparing the mean luminance value for each of the plurality of blocks of the grid with the mean luminance value corresponding to the set of AR object pixels at each of the set of brightness levels, at step 306. Further, for each of the set of brightness levels, the process 300 includes moving the AR object from the current location to a second location upon evaluating the luminance of the AR object at the current location in the frame, at step 308. It may be noted that the second location of the AR object corresponds to at least one of the plurality of blocks in the frame.

Further, for each of the current location and the second location of the AR object, the process 300 includes, changing the current camera angle to a second camera angle, at step 310. Further, for each of the current camera angle and the second camera angle, at step 312, the process 300 includes comparing the mean luminance value for each of the plurality of blocks of the grid with the mean luminance value corresponding to the set of AR object pixels, at step 312A. Further, for each of the current camera angle and the second camera angle, at step 312, the process 300 includes evaluating luminance of the AR object in the AR application based on the comparing, at step 312B. Further, the process 300 includes generating a luminance test report for the AR object based on the evaluating, at step 314. In one embodiment, the generated report may be used to verify whether the AR object is reflected as desired or not.

Figure 4:
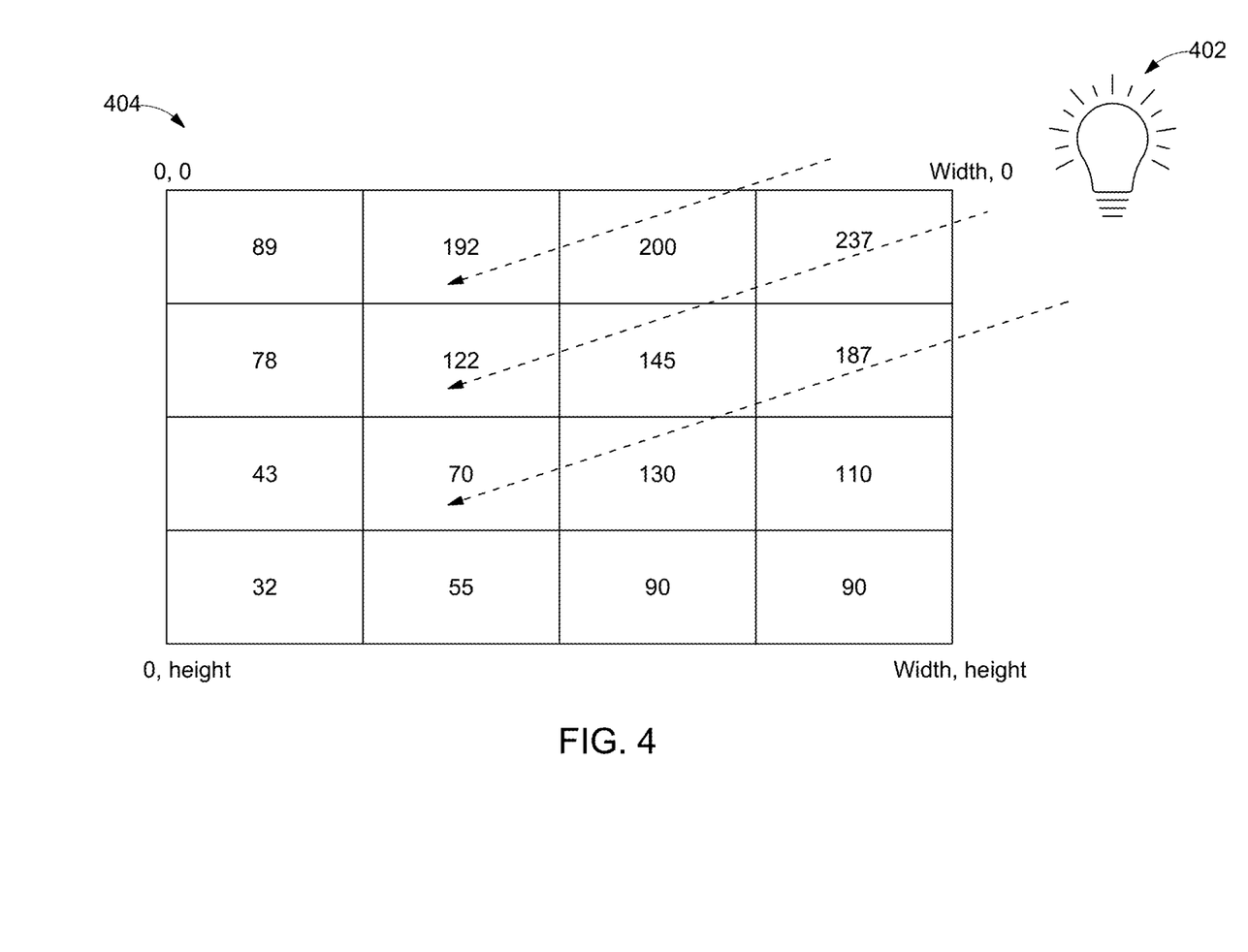
FIG. 4 illustrates determination of a direction of luminance based on the mean luminance value corresponding to each of the plurality of blocks of the grid, in accordance with some embodiments of the present disclosure.

Referring now to FIG. 4, determination of a direction of luminance based on a mean luminance value corresponding to each of a plurality of blocks of a grid 404 is illustrated, in accordance with some embodiments. Once a light source 402 is applied to the plurality of blocks of the grid 404, the image processing module 204 may determine a direction of luminance 402 based on the mean luminance value corresponding to each of the plurality of blocks of the grid 404. In an embodiment, the light source may be analogous to the light source 120. As an example, once the lighting effect applied test case is passed, the automation may move to direction of lighting effect on the AR object. With this given data set, the image processing module 204 may identify a flow of luminance value to determine in which direction the luminance is increasing and/or decreasing. The image processing module 204 may further separate the image into about 8 smaller parts (i.e., blocks) using various mid values corresponding to length and width of the image. Further, for each of the 8 smaller parts, a mean luminance value may be calculated by image processing module 204. Further, the direction of luminance may be determined with the mean luminance values of the 8 smaller parts of the image by comparing the mean luminance values in left, top, right, bottom, left-top, left bottom, right-top, and right-bottom.

Figure 5:
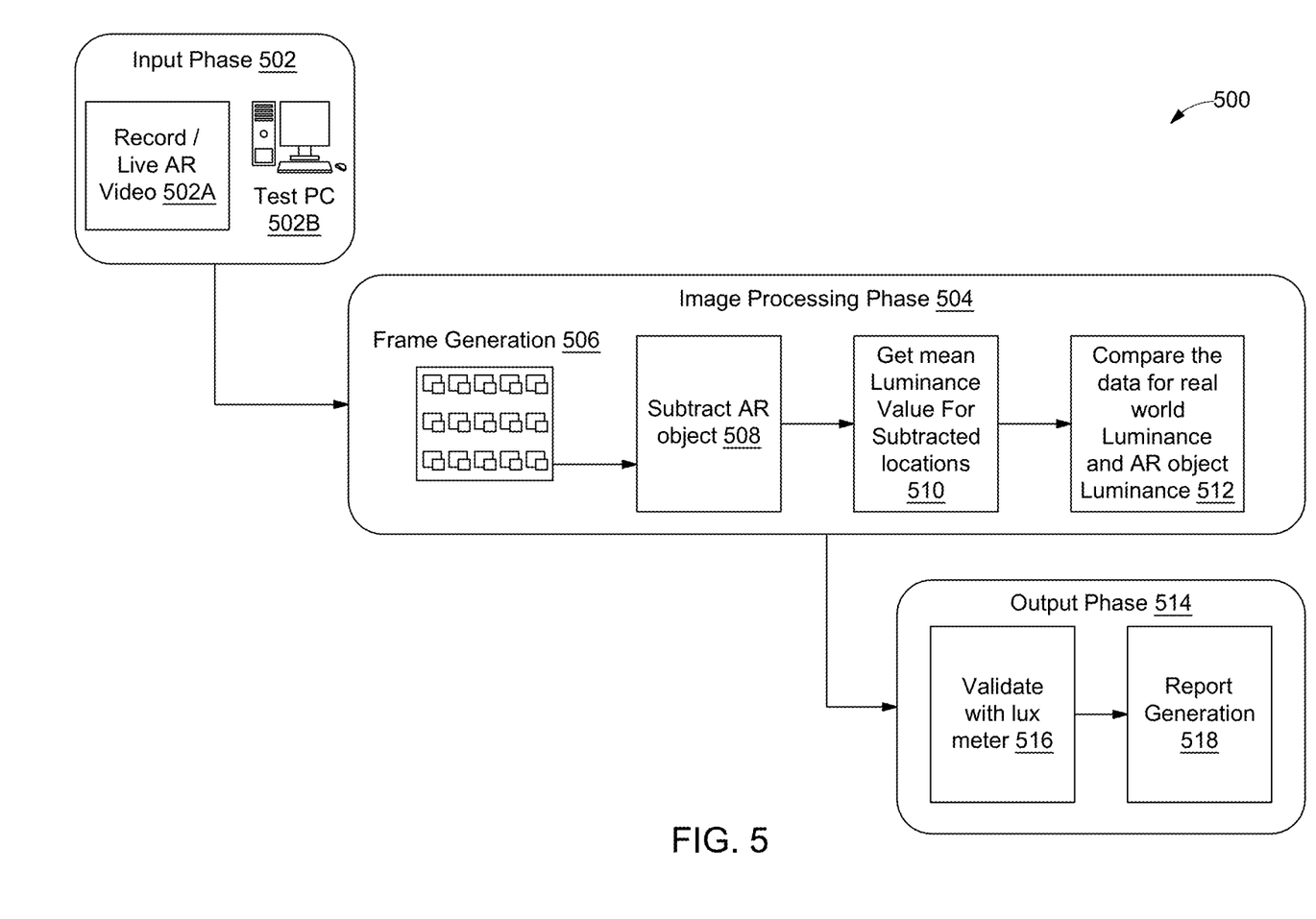
FIG. 5 illustrates a flow diagram of a control logic for comparing real-world environment lightning with AR object luminance, in accordance with some embodiments of the present disclosure.

Referring now to FIG. 5, a control logic 500 for comparing real-world environment lightning with AR object luminance is depicted via a flow chart, in accordance with some embodiments. The control logic 500 includes an input phase 502. The input phase 502 may include capturing an image or a video through the image capturing module 112. The image or the video may include an AR object and entire screen of the AR application 202 in the real-world environment. It may be noted that the AR application 202 may be tested by the luminance testing device 106 upon loading the AR application 202 in AR devices 104. By way of an example, the input phase 502 includes receiving an input as a live or a recorded AR video 502A or in form of a plurality of video frames from a test PC 502B.

Further, in an image processing phase 504 of the control logic 500, the luminance testing device 106 may generate a plurality of video frames corresponding to an AR object in a real-world environment in real-time from an AR application 202, at step 506. Each of the plurality of video frames may include a grid (for example, the grid 404). The grid may include a plurality of blocks. The AR object in each of the plurality of video frames may include a set of AR object pixels and the real-world environment in each of the plurality of video frames may include a set of environment pixels.

Further, for each of the plurality of video frames, the control logic 500 includes, subtracting, by the luminance testing device 106, the set of AR object pixels from the set of environment pixels in a frame to identify a current location of the AR object in the frame, at step 508. For example, the current location of the AR object may be identified through image subtraction by subtracting the AR object from the frame.

Further, the control logic 500 includes calculating, by the luminance testing device 106, a mean luminance value corresponding to the set of AR object pixels in each of the at least one of the plurality of blocks in the frame, at step 510. Further, the luminance testing device 106 may calculate a mean luminance value corresponding to each of the plurality of blocks of the grid in the real-world environment through a light sensor.

Further, the control logic 500 includes comparing, by the luminance testing device 106, the mean luminance value for each of the plurality of blocks of the grid with the mean luminance value corresponding to the set of AR object pixels in each of the at least one of the plurality of blocks in the frame, at step 512. In some embodiments, the luminance testing device 106 may compare the mean luminance value for each of the plurality of blocks of the grid with the mean luminance value corresponding to the set of AR object pixels at each of the set of brightness levels. In some other embodiments, the luminance value may be compared with and without AR object based on direction of the light, in the same grid. From this the lighting reflection on the object is done on the same level with the background image. This comparison may be simultaneously verified by light sensor value.

Upon comparing the real-world environment luminance with the AR object luminance in the image processing phase 504, a luminance-based verification and a report generation may take place in an output phase 514 of the control logic 500. The luminance-based verification may be performed through a lux meter (for example, the light sensor 124), at step 516. As an example, the verification methodology may include applying various light effect values in an automated manner, and captured the light values, direction, luminance, density and validate the same on AR object reflection performance values. The reflection on AR object may compare with the real-world lighting reflection in AR application 202 and validating with health parameters.

As an example, the luminance testing device 106 may capture luminance, density, and light direction values through a noninvasive method by modifying the light effect through automated manner and capture the same through the lux meter and identifying the AR object reflection quality. It may be noted that, the light sensor and lighting effects are from real-world environment and these values are passed to luminance testing device 106 for the light effect verification on the AR object.

Further, based on these values, the verification process may be done for direction-based reflection on AR object, in which area it is dense depends upon the real world ambient light. Further, the direction identification may be based on the AR object as well as real world images from the captured images from AR application 202 and through comparison between the real world and AR object. Further, the control logic 500 includes generating, by the luminance testing device 106, a luminance test report for the AR object based on the validating whether the AR object reflected as required, at step 518.

Figure 6:
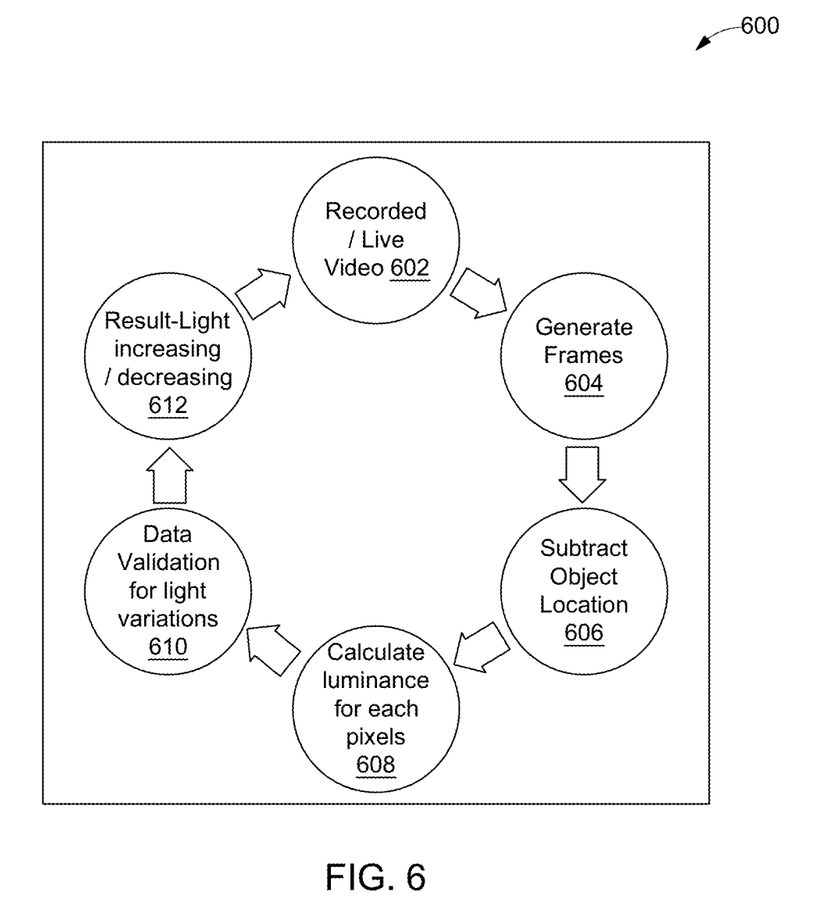
FIG. 6 illustrates a flow diagram of a detailed exemplary process for automated luminance testing of an AR application, in accordance with some embodiments of the present disclosure.

Referring now to FIG. 6 a detailed exemplary process 600 for evaluating luminance in AR applications is depicted via a flow chart, in accordance with some embodiments. At step 602 of the process 600, an image capturing module 112 of the luminance testing device 106 may capture image/video of the AR object in AR application. At block 604 of the process 600, a plurality of video frames corresponding to an AR object in a real-world environment in real-time from an AR application 202 may be generated. Each of the plurality of video frames may include a grid (for example, the grid 404). The grid may include a plurality of blocks. The AR object in each of the plurality of video frames may include a set of AR object pixels and the real-world environment in each of the plurality of video frames may include a set of environment pixels.

At step 606 of the process 600, the set of AR object pixels from the set of environment pixels in a frame may be subtracted to identify a current location of the AR object in the frame. The current location of the AR object corresponds to at least one of the plurality of blocks in the frame. At step 608 of the process 600, a mean luminance value corresponding to the set of AR object pixels in each of the at least one of the plurality of blocks in the frame may be calculated. Also, a mean luminance value corresponding to each of the plurality of blocks of the grid in the real-world environment through a light sensor may be calculated.

Further, at step 610 of the process 600, the luminance of the AR object at the current location in the AR application 202 may be evaluated by comparing the mean luminance value for each of the plurality of blocks of the grid with the mean luminance value corresponding to the set of AR object pixels in each of the at least one of the plurality of blocks in the frame. In one embodiment, the luminance effect in the AR object may be verified by providing different light effect values such as dim, light, bright, and alike, with night mode, sunshine mode, and light filters. At step 612 of the process 600, upon verification of the luminance effect in the AR object, the test report may be generated depicting whether the AR object is reflected as required.

Figure 7A:
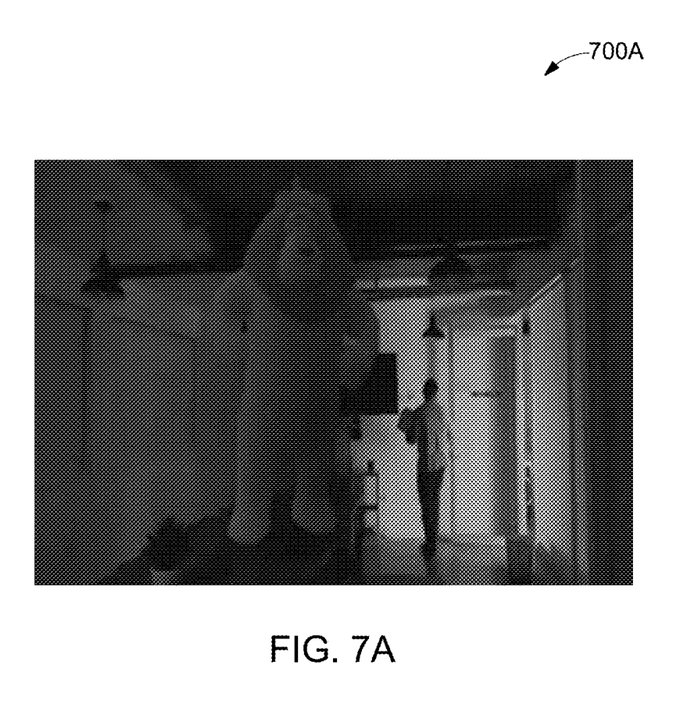
FIG. 7A illustrates an AR object without light effect in the AR application, in accordance with some embodiments of the present disclosure.
Figure 7B:
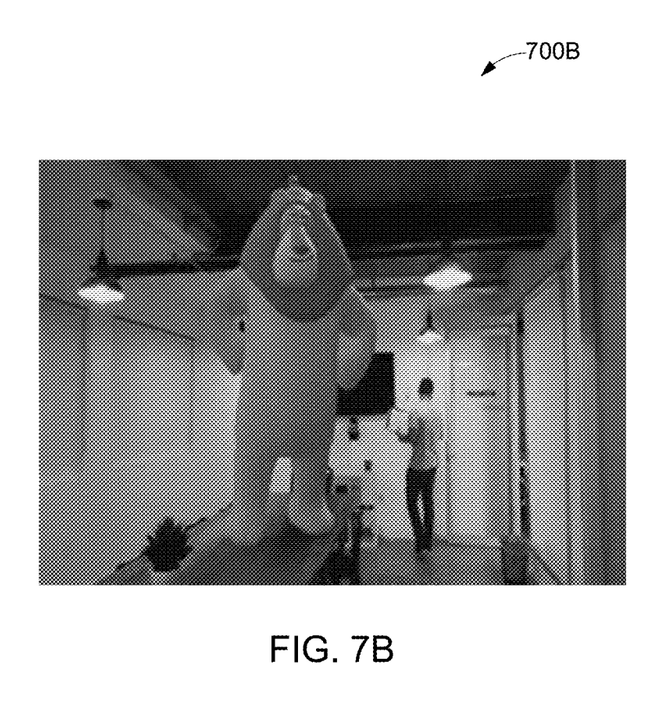
FIG. 7B illustrates an AR object with light effect in the AR application, in accordance with some embodiments of the present disclosure.

Referring now to FIGS. 7A and 7B is an AR object without light effect 700A and the AR object with light effect 700B in the AR application is illustrated, in accordance with some embodiments of the present disclosure. It may include lighting reflections, one corner of the display is bright, and the other corner of the display is dark, based on this environmental behavior the object may reflect the lighting and may react properly. In one embodiment, when an AR application may be loaded with AR object in the real-world environment, then it needs to verify whether that object is loaded properly and merge with the real-world environment. Such validation may include multiple testing aspects. One of the prime testing scenarios is with lighting effects on the AR object. The AR object should match with surrounding light. Further, the AR object should reflect the surrounding light in accordance with the real environment. As the object is augmented with real world environment, the object may also react with lighting field.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 8:
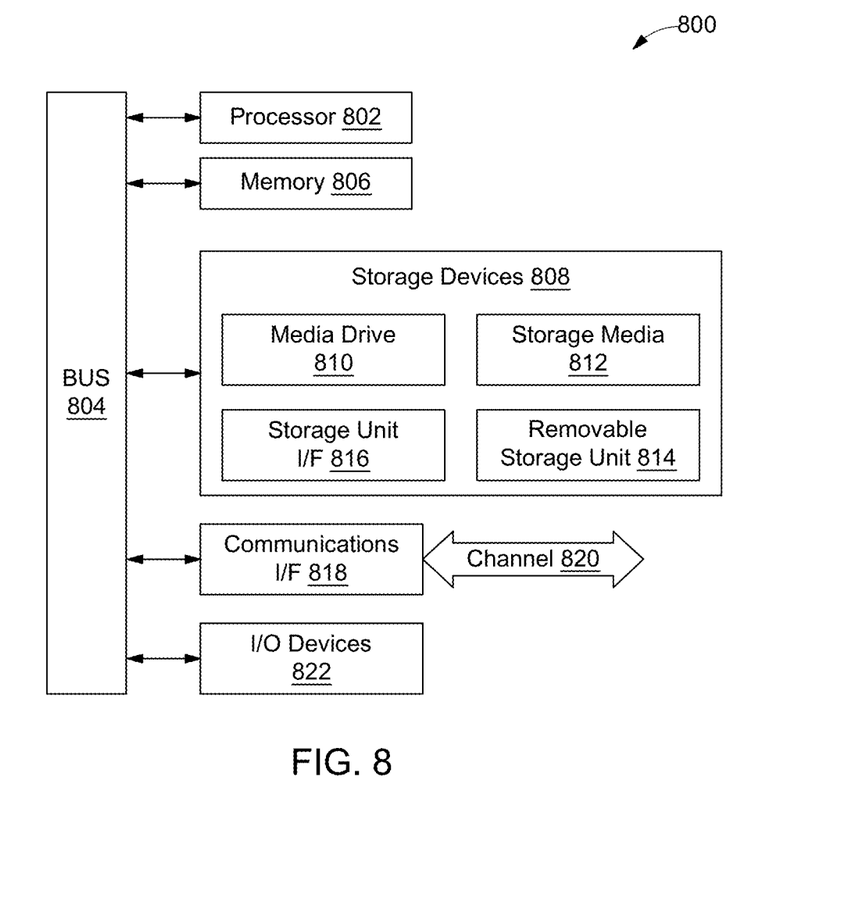
FIG. 8 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 8, an exemplary computing system 800 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 800 may represent, for example, a user device such as a desktop, a laptop, a mobile phone, personal entertainment device, DVR, and so on, or any other type of special or general-purpose computing device as may be desirable or appropriate for a given application or environment. The computing system 800 may include one or more processors, such as a processor 802 that may be implemented using a general or special purpose processing engine such as, for example, a microprocessor, microcontroller or other control logic. In this example, the processor 802 is connected to a bus 804 or other communication medium. In some embodiments, the processor 802 may be an Artificial Intelligence (AI) processor, which may be implemented as a Tensor Processing Unit (TPU), or a graphical processor unit, or a custom programmable solution Field-Programmable Gate Array (FPGA).

The computing system 800 may also include a memory 806 (main memory), for example, Random Access Memory (RAM) or other dynamic memory, for storing information and instructions to be executed by the processor 802. The memory 806 also may be used for storing temporary variables or other intermediate information during execution of instructions to be executed by the processor 802. The computing system 800 may likewise include a read only memory ("ROM") or other static storage device coupled to bus 804 for storing static information and instructions for the processor 802.

The computing system 800 may also include a storage devices 808, which may include, for example, a media drive 810 and a removable storage interface. The media drive 810 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 812 may include, for example, a hard disk, magnetic tape, flash drive, or other fixed or removable medium that is read by and written to by the media drive 810. As these examples illustrate, the storage media 812 may include a computer-readable storage medium having stored therein particular computer software or data.

In alternative embodiments, the storage devices 808 may include other similar instrumentalities for allowing computer programs or other instructions or data to be loaded into the computing system 800. Such instrumentalities may include, for example, a removable storage unit 814 and a storage unit interface 816, such as a program cartridge and cartridge interface, a removable memory (for example, a flash memory or other removable memory module) and memory slot, and other removable storage units and interfaces that allow software and data to be transferred from the removable storage unit 814 to the computing system 800.

The computing system 800 may also include a communications interface 818. The communications interface 818 may be used to allow software and data to be transferred between the computing system 800 and external devices. Examples of the communications interface 818 may include a network interface (such as an Ethernet or other NIC card), a communications port (such as for example, a USB port, a micro USB port), Near field Communication (NFC), etc. Software and data transferred via the communications interface 818 are in the form of signals which may be electronic, electromagnetic, optical, or other signals capable of being received by the communications interface 818. These signals are provided to the communications interface 818 via a channel 820. The channel 820 may carry signals and may be implemented using a wireless medium, wire or cable, fiber optics, or other communications medium. Some examples of the channel 820 may include a phone line, a cellular phone link, an RF link, a Bluetooth link, a network interface, a local or wide area network, and other communications channels.

The computing system 800 may further include Input/Output (I/O) devices 822. Examples may include, but are not limited to a display, keypad, microphone, audio speakers, vibrating motor, LED lights, etc. The I/O devices 822 may receive input from a user and also display an output of the computation performed by the processor 802. In this document, the terms "computer program product" and "computer-readable medium" may be used generally to refer to media such as, for example, the memory 806, the storage devices 808, the removable storage unit 814, or signal(s) on the channel 820. These and other forms of computer-readable media may be involved in providing one or more sequences of one or more instructions to the processor 802 for execution. Such instructions, generally referred to as "computer program code (which may be grouped in the form of computer programs or other groupings), when executed, enable the computing system 800 to perform features or functions of embodiments of the present invention.

In an embodiment where the elements are implemented using software, the software may be stored in a computer-readable medium and loaded into the computing system 800 using, for example, the removable storage unit 814, the media drive 810 or the communications interface 818. The control logic (in this example, software instructions or computer program code), when executed by the processor 802, causes the processor 802 to perform the functions of the invention as described herein.

Thus, the disclosed method and system try to overcome the technical problem of identifying common requirements from applications. The method and system provide a significant reduction in application portfolio optimization assessment. Further, the method and system provide for cost and effort optimization in identifying commonalities and uniqueness across heterogeneous monolith applications. Further, the method and system accelerate time to market by generating intelligent insights and help in making informed decisions on transformation roadmap.

As will be appreciated by those skilled in the art, the techniques described in the various embodiments discussed above are not routine, or conventional, or well understood in the art. The techniques discussed above provide for evaluating luminance in AR applications. The techniques further provide for identifying lighting effect on the AR object, background real world comparison, and in which direction light is denser. The techniques further provide a solution to identify alight that is reflected on the object through virtual images and if the light is passing from behind the object, the techniques may detect through a luminance value a change on the sides of the object. The techniques may further calculate and test the quality of AR object display. This quality test may be added into accessibility testing. After this testing, this application may be certified for all users including physically challenged people. The techniques may further be used to add as a testing methodology for AR Applications with AR devices. Based on quality improvisation during the development, the cost may be reduced. Moreover, the testing methodology is very simple, easy to adopt for any AR application, and is more user friendly.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for evaluating luminance in AR applications. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for evaluating luminance in Augmented Reality (AR) applications, the method comprising:
   receiving, by a luminance testing device, a plurality of video frames corresponding to an AR object in a real-world environment in real-time from an AR application at a current camera angle, wherein each of the plurality of video frames comprises a grid, wherein the grid comprises a plurality of blocks, and wherein the AR object in each of the plurality of video frames comprises a set of AR object pixels and the real-world environment in each of the plurality of video frames comprises a set of environment pixels;
   for each of the plurality of video frames,
      subtracting, by the luminance testing device, the set of AR object pixels from the set of environment pixels in a frame to identify a current location of the AR object in the frame, wherein the current location of the AR object corresponds to at least one of the plurality of blocks in the frame;
      calculating, by the luminance testing device, a mean luminance value corresponding to the set of AR object pixels in each of the at least one of the plurality of blocks in the frame;
      calculating, by the luminance testing device, a mean luminance value corresponding to each of the plurality of blocks of the grid in the real-world environment through a light sensor;
      comparing, by the luminance testing device, the mean luminance value for each of the plurality of blocks of the grid with the mean luminance value corresponding to the set of AR object pixels in each of the at least one of the plurality of blocks in the frame; and
      evaluating, by the luminance testing device, luminance of the AR object at the current location in the AR application based on the comparing.

2. The method of claim 1, wherein the real-world environment comprises one or more light sources, and wherein each of the one or more light sources comprises a set of brightness levels.

3. The method of claim 2, further comprising comparing the mean luminance value for each of the plurality of blocks of the grid with the mean luminance value corresponding to the set of AR object pixels at each of the set of brightness levels.

4. The method of claim 3, further comprising, for each of the set of brightness levels, moving the AR object from the current location to a second location upon evaluating the luminance of the AR object at the current location in the frame, wherein the second location of the AR object corresponds to at least one of the plurality of blocks in the frame.

5. The method of claim 4, further comprising, for each of the current location and the second location of the AR object, changing the current camera angle to a second camera angle.

6. The method of claim 5, further comprising:
   for each of the current camera angle and the second camera angle,
      comparing the mean luminance value for each of the plurality of blocks of the grid with the mean luminance value corresponding to the set of AR object pixels; and
      evaluating luminance of the AR object in the AR application based on the comparing.

7. The method of claim 6, further comprising generating a luminance test report for the AR object based on the evaluating.

8. The method of claim 1, further comprising determining a direction of luminance based on the mean luminance value corresponding to each of the plurality of blocks of the grid.

9. The method of claim 1, further comprising determining a density of luminance for each of the plurality of blocks of the grid based on the mean luminance value corresponding to each of the plurality of blocks of the grid.

10. A system for evaluating luminance in Augmented Reality (AR) applications, the system comprising:
   an AR device and a luminance testing device comprising a processor and a memory communicatively coupled to the processor, wherein the memory stores processor-executable instructions, which, on execution, causes the processor to:
      receive a plurality of video frames corresponding to an AR object in a real-world environment in real-time from an AR application at a current camera angle, wherein each of the plurality of video frames comprises a grid, wherein the grid comprises a plurality of blocks, and wherein the AR object in each of the plurality of video frames comprises a set of AR object pixels and the real-world environment in each of the plurality of video frames comprises a set of environment pixels;
      for each of the plurality of video frames, subtract the set of AR object pixels from the set of environment pixels in a frame to identify a current location of the AR object in the frame, wherein the current location of the AR object corresponds to at least one of the plurality of blocks in the frame;

calculate a mean luminance value corresponding to the set of AR object pixels in each of the at least one of the plurality of blocks in the frame;

calculate a mean luminance value corresponding to each of the plurality of blocks of the grid in the real-world environment through a light sensor;

compare the mean luminance value for each of the plurality of blocks of the grid with the mean luminance value corresponding to the set of AR object pixels in each of the at least one of the plurality of blocks in the frame; and evaluate luminance of the AR object at the current location in the AR application based on the comparing.

11. The system of claim 10, wherein the real-world environment comprises one or more light sources, and wherein each of the one or more light sources comprises a set of brightness levels.

12. The system of claim 11, wherein the processor instructions, on execution, further cause the processor to compare the mean luminance value for each of the plurality of blocks of the grid with the mean luminance value corresponding to the set of AR object pixels at each of the set of brightness levels.

13. The system of claim 12, wherein, for each of the set of brightness levels, the processor instructions, on execution, further cause the processor to move the AR object from the current location to a second location upon evaluating the luminance of the AR object at the current location in the frame, wherein the second location of the AR object corresponds to at least one of the plurality of blocks in the frame.

14. The system of claim 13, wherein, for each of the current location and the second location of the AR object, the processor instructions, on execution, further cause the processor to change the current camera angle to a second camera angle.

15. The system of claim 14, wherein the processor instructions, on execution, further cause the processor to:

for each of the current camera angle and the second camera angle, compare the mean luminance value for each of the plurality of blocks of the grid with the mean luminance value corresponding to the set of AR object pixels; and evaluate luminance of the AR object in the AR application based on the comparing.

16. The system of claim 15, wherein the processor instructions, on execution, further cause the processor to generate a luminance test report for the AR object based on the evaluating.

17. The system of claim 10, wherein the processor instructions, on execution, further cause the processor to determine a direction of luminance based on the mean luminance value corresponding to each of the plurality of blocks of the grid.

18. The system of claim 10, wherein the processor instructions, on execution, further cause the processor to determine a density of luminance for each of the plurality of blocks of the grid based on the mean luminance value corresponding to each of the plurality of blocks of the grid.

19. A computer program product for evaluating luminance in Augmented Reality (AR) applications, the computer program product embodied in a non-transitory computer readable storage medium and comprising computer-executable instructions configured for:

receiving a plurality of video frames corresponding to an AR object in a real-world environment in real-time from an AR application at a current camera angle, wherein each of the plurality of video frames comprises a grid, wherein the grid comprises a plurality of blocks, and wherein the AR object in each of the plurality of video frames comprises a set of AR object pixels and the real-world environment in each of the plurality of video frames comprises a set of environment pixels;

for each of the plurality of video frames, subtracting the set of AR object pixels from the set of environment pixels in a frame to identify a current location of the AR object in the frame, wherein the current location of the AR object corresponds to at least one of the plurality of blocks in the frame;

calculating a mean luminance value corresponding to the set of AR object pixels in each of the at least one of the plurality of blocks in the frame;

calculating a mean luminance value corresponding to each of the plurality of blocks of the grid in the real-world environment through a light sensor;

comparing the mean luminance value for each of the plurality of blocks of the grid with the mean luminance value corresponding to the set of AR object pixels in each of the at least one of the plurality of blocks in the frame; and evaluating luminance of the AR object at the current location in the AR application based on the comparing.

20. The computer program product of claim 19, wherein the real-world environment comprises one or more light sources, and wherein each of the one or more light sources comprises a set of brightness levels.

* * * * *